United States Patent [19]
Maresca, Jr. et al.

[11] Patent Number: 5,146,784
[45] Date of Patent: Sep. 15, 1992

[54] SENSOR FOR MEASURING LIQUID-LEVEL CHANGES IN STORAGE TANKS

[75] Inventors: Joseph W. Maresca, Jr., Sunnyvale, Calif.; James W. Starr, Bound Brook; Richard F. Wise, Manville, both of N.J.

[73] Assignee: Vista Research, Inc., Mountain View, Calif.

[21] Appl. No.: 664,320

[22] Filed: Mar. 4, 1991

[51] Int. Cl.[5] .................. G01F 23/60; H01F 21/06
[52] U.S. Cl. ................................. 73/313; 73/308; 336/136
[58] Field of Search .................. 73/313; 364/509; 336/30, 136

[56] References Cited

U.S. PATENT DOCUMENTS

| | | | |
|---|---|---|---|
| 2,359,927 | 10/1944 | Melas | 73/313 X |
| 3,834,234 | 9/1974 | Kobayashi et al. | 336/136 X |
| 4,321,826 | 3/1982 | Bibbee et al. | 73/313 |
| 4,407,159 | 10/1983 | Wytaniec | 73/290 R |
| 4,497,205 | 2/1985 | Zulauf et al. | 73/313 |
| 4,852,054 | 7/1989 | Mastandrea | 364/509 |

Primary Examiner—Daniel M. Yasich
Attorney, Agent, or Firm—Rosenblum, Parish & Isaacs

[57] ABSTRACT

The improved device for measuring liquid-level changes in storage tanks uses a float to track vertical displacement of the surface of a liquid and a linear variable differential transducer (LVDT) sensor positioned below the surface of the liquid to measure changes in the surface level. The center of gravity of the device is located below the center of buoyancy, thereby minimizing instability of the LVDT sensor.

7 Claims, 5 Drawing Sheets

SENSOR FOR MEASURING LIQUID-LEVEL CHANGES IN STORAGE TANKS

BACKGROUND OF THE INVENTION a. Field of the Invention

The present invention relates to an apparatus for measuring small changes in the level of liquids stored in underground or aboveground tanks, which apparatus can be used as part of a system to detect leaks.

b. Brief Discussion of the Prior Art

Most methods used to detect small leaks in underground or aboveground storage tanks containing petroleum liquids or other chemical liquids considered hazardous to the environment use (1) a level sensor to estimate the changes in the volume of liquid that occur during a test and (2) a means to compensate for the volume changes that occur as a result of thermal expansion or contraction of the liquid. Most methods use a vertical array of temperature sensors to make the measurements that will be used to compensate for these thermally induced volume changes. In tests conducted on partially filled underground tanks, or those conducted on aboveground tanks, even large volume changes produce only small level changes, because the cross-sectional area of the liquid surface in these tanks is very large. In a half-filled 10,000-gal underground storage tank, for example, a volume change of 0.1 gal results in a level change of 0.00075 in. As a consequence, a level sensor with a high degree of precision is required for such tests.

A common method for measuring the change in level of a liquid in a storage tank is to measure the vertical displacement of a float resting on the surface of the liquid. There are many methods used to measure small liquid-level changes with a float system. One of the most common is shown in FIG. 1. In FIG. 1a, a displacement sensor 10 is mounted rigidly by means of a connector 11 in the fill tube 2 of a tank 1, and in FIG. 1b this sensor 10 is attached by means of a connector 12 to a mount 3 that extends downward from the fill tube 2. A rod 5 capable of vertical movement extends through the sensor, guided by means of a track, holder, or "bumper guide" 7. A float 6 resting on the surface of the liquid is affixed to the lower end of the rod 5. It is assumed that as the level of the liquid in the tank changes, the level of the float-and-rod subsystem 4 will change by an identical amount; this is true if the density of the liquid surrounding the float 6 does not change during the measurement period. The vertical displacement of the float 6 is measured by the rod's 5 movement through the sensor 10. In some systems, a portion of the rod 5 has calibrated markings that are read by the displacement sensor 10. There are many types of commercially available displacement sensors 10 that can be used to measure the movement of the rod 5. Strain gauges, optical, capacitance, electromagnetic, and acoustic sensors are some examples.

The accuracy of measuring level changes with the scheme illustrated in FIG. 1 depends on the frictional effects between the bumper guide 7 and the rod 5. Any contact between them may cause the rod 5 to stick. Contact is likely to occur because the center of gravity of the float-and-rod subsystem 4 is located above its center of buoyancy, making it rotationally unstable. Another factor that may cause or contribute to sticking is the size of the level change. When level changes are very small, the upward or downward force they exert may not be enough to counter the frictional force between the guide 7 and the rod 5. Sticking due to one or both of these factors has been observed in this type of level sensor 10.

The accuracy of measuring level changes is also affected if thermal expansion and contraction cause any changes in the size of the rod 5 or the mounting system 3. When the sensor is mounted at the fill hole or in the top portion of the tank 1, it is subjected to the temperature changes occurring in the vapor space above the liquid surface; these are generally more extreme than the temperature changes that occur below the surface, and as a result the amount of expansion and contraction in the rod 5 and/or mounting system 3 and/or fill tube 2 can be significant. Measurement errors are largest when the level of the liquid in the tank 1 is low and there is a considerable distance between the float 6 and the connector 11 at the fill tube 2 (FIG. 1a) or between the float 6 and the connector 12 at the mount 3 (FIG. 1b). Compensating for thermally induced changes in the length of the equipment (fill tube 2, rod 5 and mounting system 3) by measuring the temperature changes in the vapor space has been attempted.

In U.S. Pat. No. 4,852,054, Mastandrea describes a float/level-sensing system that uses the measurement concept illustrated in FIG. 1. This level sensor 10 is part of a larger system for detecting leaks in underground storage tanks 1. A linear variable displacement transducer (LVDT) 8/9, which is an off-the-shelf, commercially available inductive sensor (in this case manufactured by Schaevitz, Inc.), is used to measure the vertical displacement of a float 6. The LVDT 8/9 is an electromechanical device that consists of a coil assembly 9 and a separate, movable core 8. The coil assembly 9 produces an electrical output proportional to the displacement of the core 8 as this core passes vertically through the coils. The LVDT 8/9 and the float-and-rod subsystem 4 are mounted in a cylindrical tube, which is suspended from the top of the tank. One of the problems encountered with the Mastandrea level-sensing system is that if the diameter of the float 6 is too large with respect to the diameter of this tube, the effects of surface tension will prevent the float 6 from accurately tracking the displacement of the surface. Other problems include the susceptibility of the rod 5 to sticking and the fact that thermal changes in the vapor space can cause the equipment to expand and contract. These are both sources of measurement error, as discussed in the preceding two paragraphs.

SUMMARY OF THE PRESENT INVENTION

It is an object of the present invention to provide an apparatus for precise measurement of the liquid-level changes that occur in storage tanks.

Another object of the present invention is to provide an apparatus for precise measurement of the liquid-level changes that occur during leak detection tests.

Briefly, the preferred embodiment of the present invention comprises (1) a two-component level sensor consisting of an LVDT core and an LVDT coil assembly through which the core moves vertically, and (2) a float that rests on the liquid surface and is attached to the LVDT core by a rod in such a way that any height fluctuation in the liquid surface causes the core to move up or down within the coil assembly. Both components of the level sensor (the LVDT core and the LVDT coil assembly) are submerged in the liquid for the duration of the measurements; the unit comprising the float-and-rod subsystem and LVDT core is not physically attached to the LVDT coil assembly in any way, and therefore has complete freedom of movement in the vertical direction. The float's center of gravity is such that the LVDT core, and the rod that connects it to the float, remain absolutely vertical. A ring-shaped TEFLON ® bumper guide attached to the rod ensures that the core is centered in the coil assembly. The level sensor is driven by an external power supply. The level sensor is controlled by a microprocessor or computer, which collects data digitally, reduces voltage data to engineering units, stores the level changes, and displays the results. Data are generally collected between 0.017 and 100 Hz (0.01 and 100 seconds per sample) and averaged to between 0.0167 and 0.0833 Hz (1 and 5 minutes per sample); however, other sampling rates can be used. Although the level sensor's primary application is testing the integrity of underground or aboveground stoage tanks, especially those containing petroleum fuels, it is by no means limited to that application and could easily be used on tanks containing other chemicals or even to solve other liquid-level measurement problems.

DESCRIPTION OF THE PREFERRED EMBODIMENT

Physical Configuration

Figure 1A:
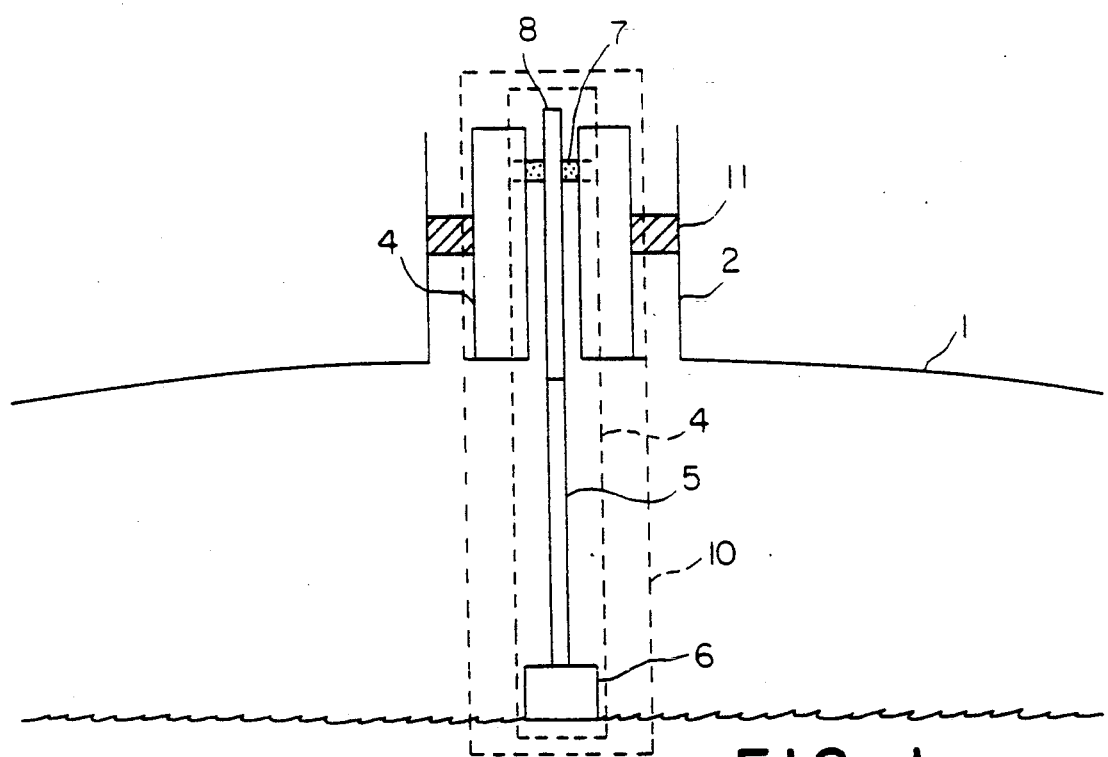
FIGS. 1a and 1b illustrate commonly used approaches for measuring liquid-level changes in a storage tank by means of a displacement sensor suspended from the top of the tank.
Figure 1B:
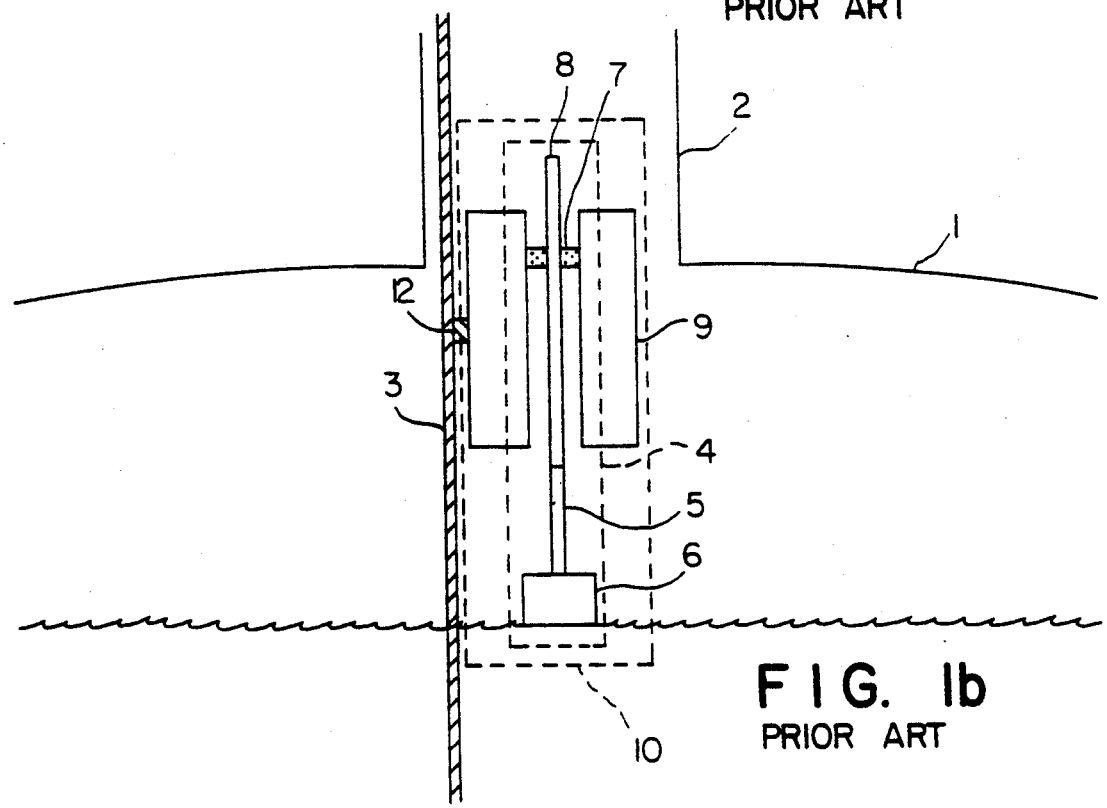
Figure 2A:
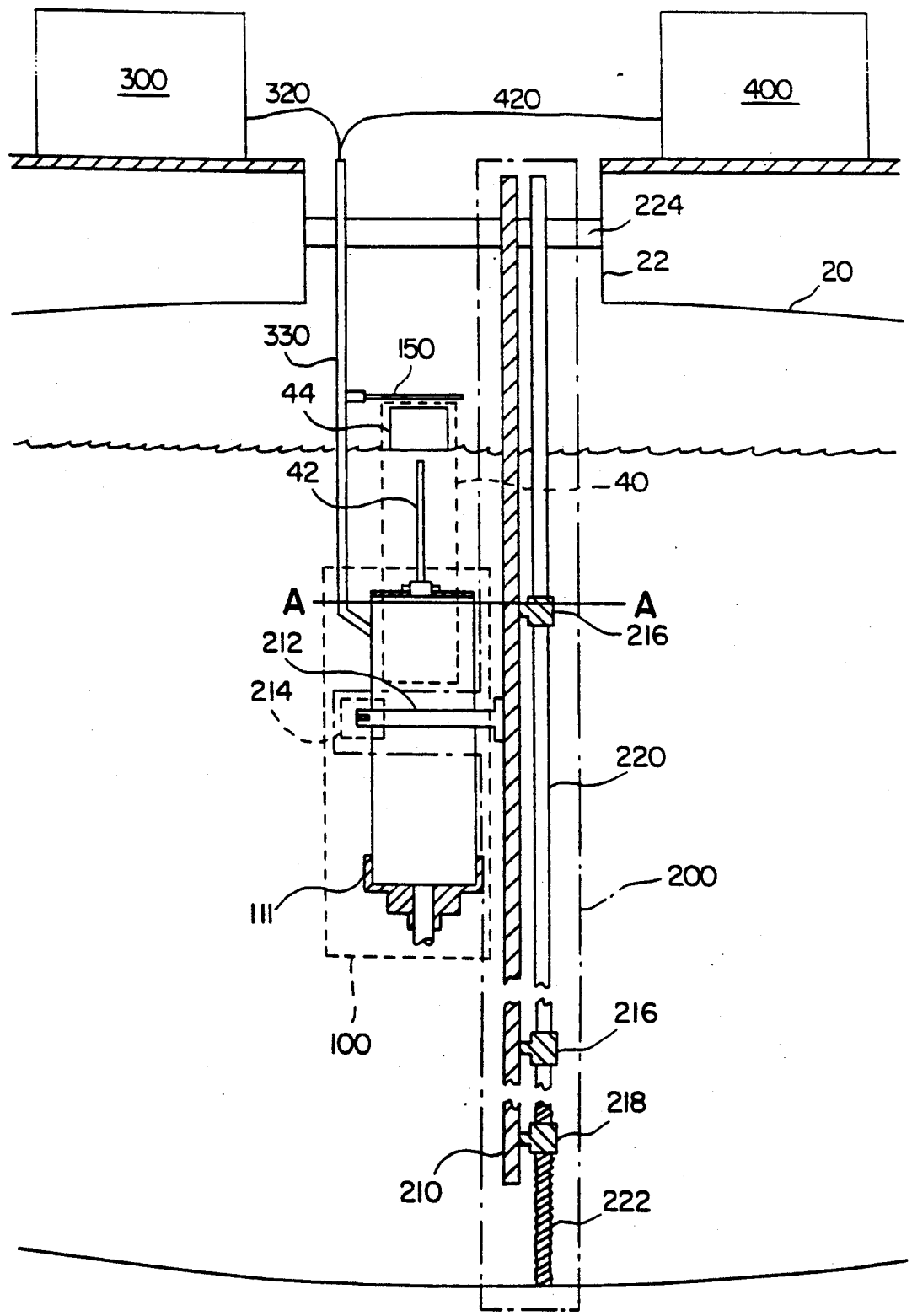
FIG. 2a illustrates the preferred embodiment of the present invention, a level sensor as it would be used in a liquid-level measurement system designed to test the integrity of an underground storage tank.
Figure 2B:
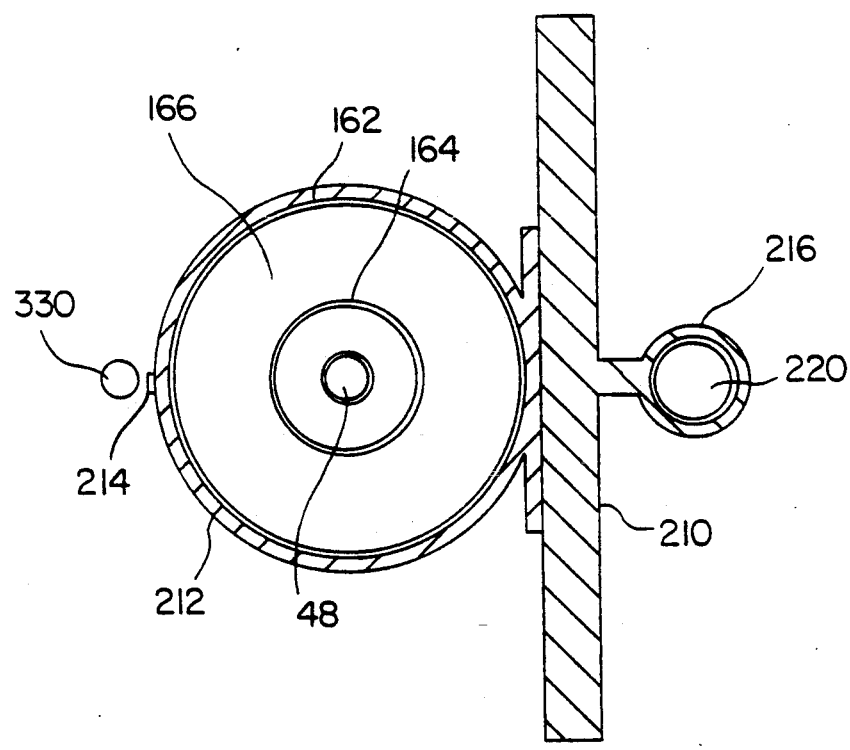
FIG. 2b is a cross-sectional view of the level sensor shown in FIG. 2a taken along line A—A.

The preferred embodiment of the present invention is illustrated in FIGS. 2a and 2b as it would be used in a level measurement subsystem that is part of a larger system for testing the integrity of an underground storage tank 20. The present invention has four components: the level sensor assembly 100, a mounting system 200, a power supply and signal conditioner 300, and a sensor controller/system controller 400. The level sensor assembly 100, which is positioned below the surface of the liquid, and its mounting system 200 are designed to fit into the smallest openings normally found in an underground storage tank 20; these openings are approximately 2 to 4 in. in diameter.

Level Sensor Assembly

Figure 3:
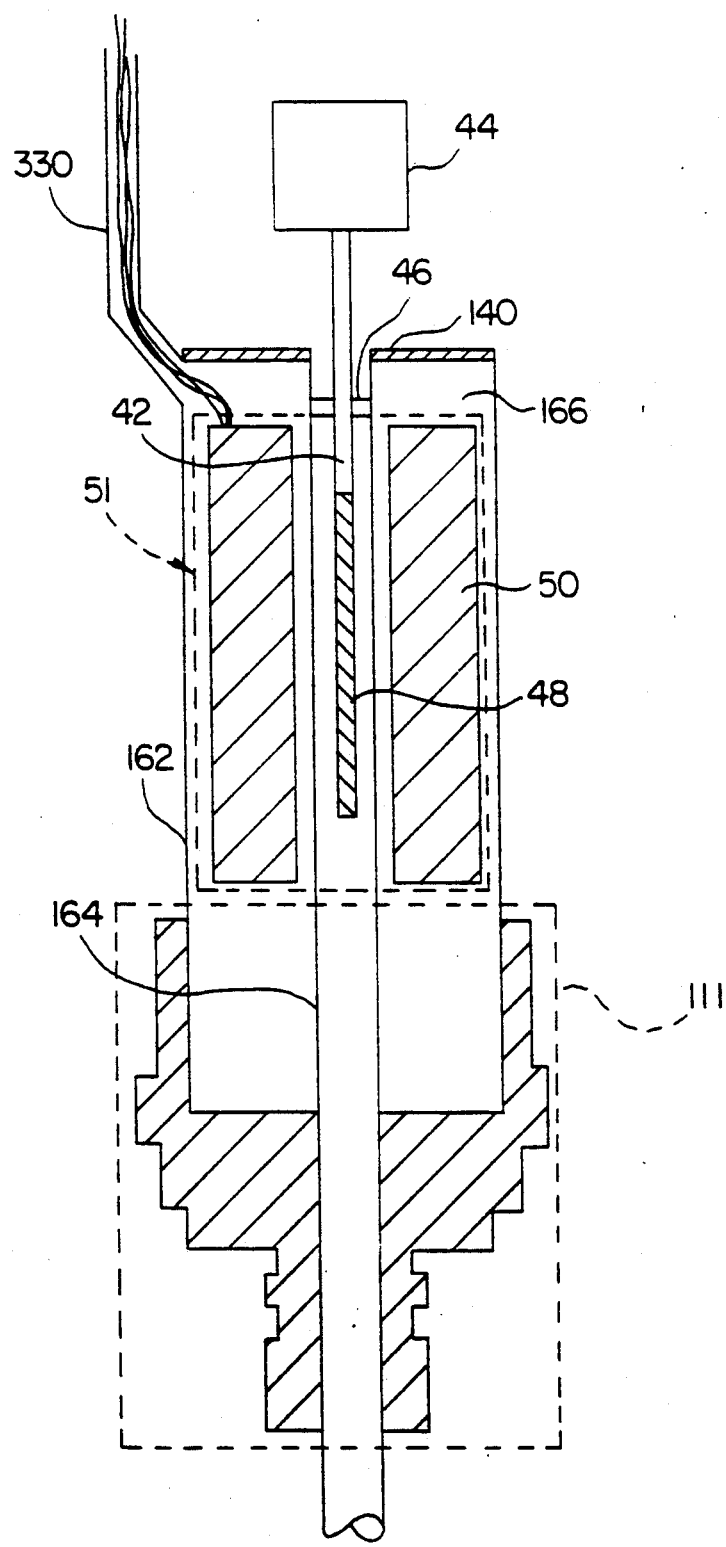
FIG. 3 is a cutaway view of the level sensor assembly (LVDT core, LVDT coil, and float) in accordance with the preferred embodiment of the present invention.

With reference to FIGS. 2b and 3, the level sensor assembly 100 is housed in two concentric, cylindrical stainless steel tubes 162 and 164. An LVDT assembly 51 includes an LVDT core 48 and an LVDT coil assembly 50. The LVDT core 48, made of a highly permeable, hydrogen-annealed nickel-and-iron compound, comprises the bottom section of the rod 42 that is affixed to the float 44, and is free to move up and down within the inner steel tube 164; the rod 42 and the core 48 are kept parallel to the tube wall 164 by means of a ring-shaped TEFLON ® bumper guide 46 attached to the rod 42. The LVDT coil assembly 50, consisting of two secondary coils symmetrically placed about a primary coil, is mounted around a cylindrical form in the shape of an elongated donut, and is located in the space between the outer wall of the inner steel tube 164 and the inner wall of the outer steel tube 162. This intertubular space 166 is sealed at the top by means of a silver-soldered o-ring and nut 140 and at the bottom by means of a compression fitting assembly 111, this provides a liquid-tight housing for the LVDT coil assembly 50, while the LVDT core 48 that moves up and down through the coil assembly 50 remains immersed in the liquid in the tank 20. Because the compression fitting assembly 111 can be taken apart, the coil assembly 50 remains accessible for servicing or replacement despite its being hermetically sealed. (If accessibility is not desired, the compression fitting can be replaced by a method that will seal the coil assembly 50 permanently.)

Figure 4:
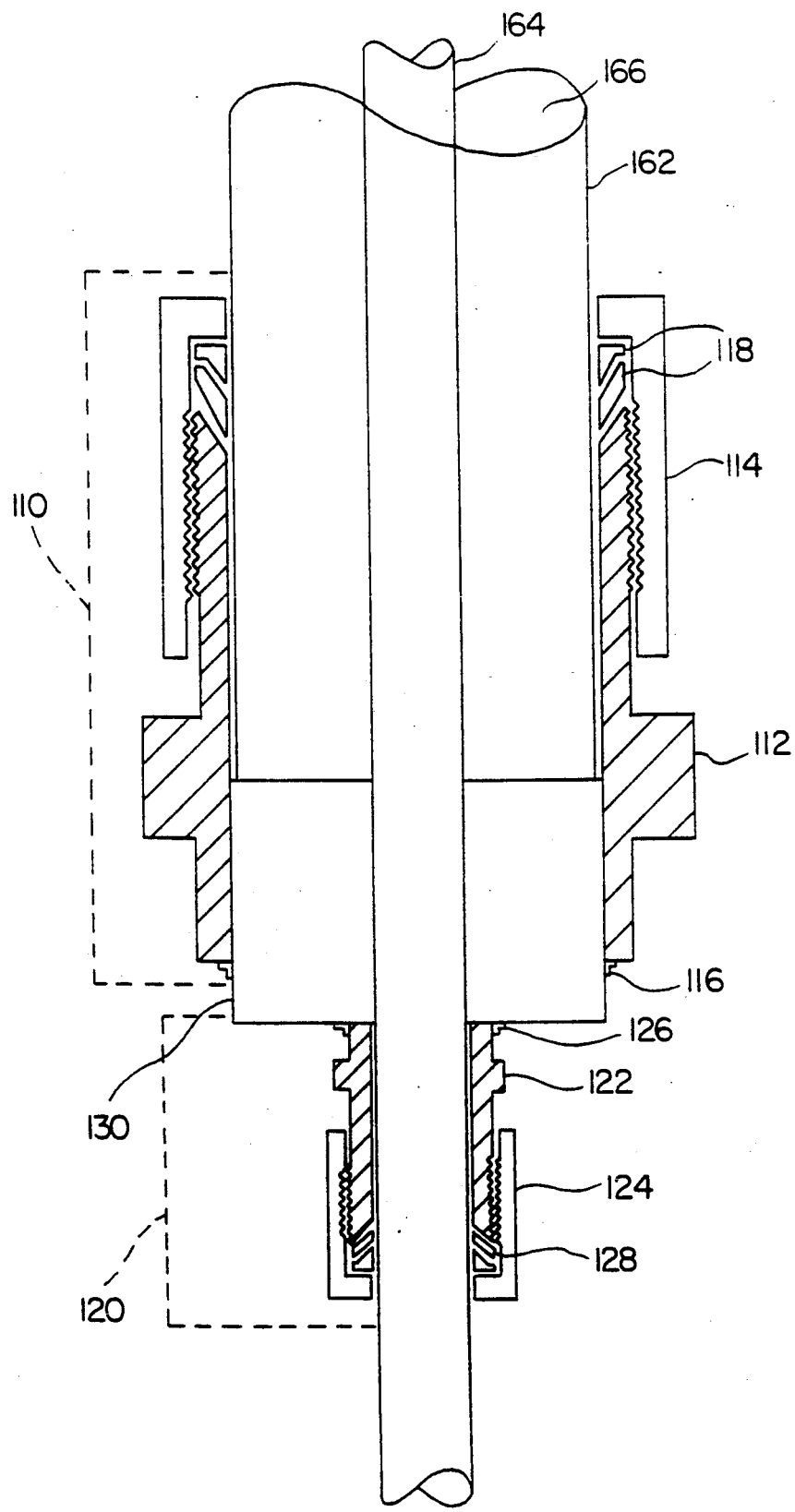
FIG. 4 is a cross-sectional view of the compression fitting that seals the bottom of the LVDT coil housing.

With reference to FIG. 4, a large compression fitting 110 is composed of two parts: (1) a cylindrical body 112, 1 inch in diameter, that fits snugly around the bottom of the outer steel tube 162 and that is threaded along its outer upper portion, and (2) a threaded cylinder 114 that screws onto the body 112 and locks into place; a two-piece nylon ferrule 118 inserted between the body 112 and the screw-on cylinder 114 forms a liquid-tight seal. A small compression fitting 120, this one ⅜ inch in diameter and oriented such that it is upside-down with regard to the large compression fitting 110, fits snugly around the inner steel tube 164 (which is longer than the outer tube 162 and extends beyond it). Again, a two-piece nylon ferrule 128 is inserted between the body 122 and the screw-on cylinder 124. A brass bushing 130 that serves as an extension of the smaller compression fitting 120 fits inside the body 112 of the large compression fitting 110. Where the bushing 130 meets the larger fitting 110, and again where it meets the smaller fitting 120, joints 116, 126 are soldered with silver. Thus, with the nylon ferrules 118, 128 at the top and bottom and the soldered joints 116, 126 at the mid-section, the entire compression fitting assembly 111 is liquid-tight.

Referring back to FIGS. 2a and 3 if the level of product goes down markedly with relation to the position of the sensor assembly 100, the float 44 will simply come to rest on top of the sensor assembly 100. If it goes up markedly, however, the float could conceivably rise enough that the rod 42 and the core 48 would be pulled up and out of the sensor assembly 100. To prevent this from happening, there is a flat, horizontal guard 150 attached to a stainless steel conduit 330 (which houses the power- and data-transmission cables 320, 420) at a location right above the float 44. This guard 150 prevents the float-and-rod subsystem 40 from escaping. The guard 150 can be configured any number of ways—a thin plate, a wire mesh lid, etc. In this embodiment, it is a wire ring.

The dynamic range required of the LVDT assembly 51 used in the level sensor assembly 100 depends on the measurement application. The smaller the dynamic range, the better the resolution (of a digital system with a fixed number of bits) and precision of the liquid-level measurements, but the more difficult it is to position the assembly 100 in the tank 20. For most leak detection tests in underground storage tanks, a precision of 0.001 in. or better is required. Given the current technology, the required dynamic range is ±0.2 in. (The LVDT assembly 51 used in this application has a dynamic range of ±0.2 in.) The level changes that occur during most leak detection tests in a 10,000-gal underground storage tank are typically several thousandths of an inch per hour or less; even the most extreme level changes generally do not exceed several hundredths of an inch per hour. Thus, the level changes expected during a test are so much smaller than the dynamic range of the sensor that, even if the level sensor assembly 100 is not centered exactly at the midpoint of the dynamic range of the LVDT, the accuracy of the measurements will not be affected.

The preferred embodiment of the present invention minimizes the possibility that the TEFLON ® bumper guide 46 will stick against the inner wall of the inner steel tube 164. Because the center of gravity of the float-and-rod subsystem 40 has been located below its center of buoyancy, the rod 42 and the core 48 will move in parallel fashion and without rotational instability through the coil assembly 50, in response to any vertical movement of the liquid. Any contact between the bumper guide 46 and the wall of the tube 164 will be limited to bumping caused by horizontal movement of the liquid in the tank 20.

Mounting System

The mounting system 200 allows the positioning of the sensor assembly 100 at any level within the tank 20. This mounting system 200, illustrated in FIGS. 2a and 2b, is comprised of (1) a staff 210 to which the level sensor 100 is attached by means of a clamp 212 and screw-and-nut assembly 214, and to which a number of ring-shaped holders 216 are bolted at different levels along the vertical, and (2) a long, slender pole 220 inserted through these holders. The clamp 212 and screw-and-nut assembly 214 permit gross adjustments in the position of the sensor along the staff 210, while the pole 220 (whose lower end 222 is threaded) and the lowest holder 218 (which is also threaded) permit fine-scale adjustments. The level sensor assembly 100 must be carefully positioned with regard to the level of the liquid in the tank 20 in order for measurements of changes in liquid level to be accurate.

The mounting system 200 is held in place by a collar 224 at the fill tube 22. This collar 224 is rigid and, although not permanently affixed to the fill tube 22, keeps the mounting system 200 from moving during the measurements.

The mounting system 200 can fit into an opening only slightly bigger than its own diameter. In order to further minimize the diameter of the level sensor assembly 100, the clamp 212 and locking screw-and-nut assembly 214 may be placed underneath the level sensor assembly 100 rather than around its circumference, as shown in this embodiment. The location of the clamp 212 and screw-and-nut assembly 214 is not critical as long as it does not interfere with the free movement of the float 44.

The preferred embodiment of the present invention minimizes the effects of thermal expansion or contraction on both the rod 42 and the core 48 and the mounting system 200. Because they are submerged (the rod 42 and the core 48 completely so and the mounting system 200 almost completely so) they are not exposed to temperature changes in the vapor space, which can be much greater than those in the liquid. Temperature changes of the liquid in an underground tank 20 during most leak detection tests are typically 0.01° C./h or less, not enough to cause significant expansion or contraction of the rod 42, the core 48 and/or mounting system 200.

Power Supply and Signal Conditioner

With reference to FIGS. 2a and 3 the level sensor assembly 100 is driven by an external power supply 300, either AC or DC. The cable 320 that connects the level sensor assembly 100 to its power supply 300 is housed in a small, liquid-tight conduit 330 made of stainless steel. The primary coil is energized by the external power source 300, and voltages are induced in the two secondary coils. The core 48 provides a path for the magnetic flux linking the coil assembly 50. When the core 48 changes position inside the coil assembly 50, the difference in the induced voltage between the two secondary coils increases linearly.

The power supply and signal conditioner 300, which are located above ground, communicate electronically with the level sensor assembly 100 through a cable 320 that carries power to the level sensor assembly 100 and data back to the signal conditioner 300. If it is desirable to minimize the length of the conduit 330, an electrical connector can be placed in the vapor space near the level sensor 100. The cable 320 would then have to extend only from the level sensor assembly 100 to the vapor space, and would be plugged into the connector, which would link it to the aboveground equipment.

Sensor Controller/System Controller

Like the power supply and signal conditioner 300, the sensor controller/system controller 400 is also located above gound and also communicates electronically with the level sensor assembly 100, but through a different cable 420, which carries command data to the level sensor assembly 100 and displacement data back to the sensor controller/system controller 400.

The cables 320 and 420 are shown underground in FIG. 2a, but they can also be located above ground. Indeed, cables are not even necessary if telemetric communication can be arranged.

Use

A two-step procedure is used to position the level sensor assembly 100. The first step is to measure the depth of the liquid in the tank 20 with a gauging stick. Usually, a measurement accurate to within 0.125 to 0.25 in. is possible. The level sensor assembly 100 is positioned on the staff 210 and locked in place with the clamp 212 and screw-and-nut assembly 214. The level sensor assembly 100 is then placed in the tank 20 and an experimental reading is taken. If the reading is within the dynamic range of the LVDT assembly 51, but not suitable for the measurement, the second step is to adjust the position of the level sensor assembly 100 with the fine-scale adjustment mechanism (the "leveling screw" 222 at the bottom of the pole 220). If the reading is not within the dynamic range of the LVDT assembly 51, or if the needed adjustment is beyond the range of the fine-scale adjustment mechanism 220, the two-step positioning procedure must be repeated.

Alternative Embodiments

An alternative embodiment of the level sensor assembly 100 is identical to the preferred embodiment shown in FIG. 2, except that the float-and-rod subsystem 40 is enclosed in a cylindrical tube. The purpose of this cylindrical tube is to protect the float-and-rod subsystem 40 from damage. The diameter of the float 44 must be small enough with respect to diameter of this tube to overcome surface tension and frictional effects, so that there is a one-to-one response between the float 44 and the liquid level.

In a second alternative embodiment of the level sensor assembly 100, the entire level sensor assembly 100 is contained within a cylindrical tube. The tube can be attached to a vertical mount or can itself be used as a vertical mount.

It is to be understood that the forms of the invention herein shown and described are to be taken as preferred examples of the invention and that various changes in the shape, size, materials and arrangement of parts may be made without departing from the invention or the scope of the claim.

What is claimed:

1. A device for measuring level changes in a storage tank containing a liquid product, comprising:
   (a) float means to track vertical displacement of the surface of said liquid product;
   (b) linear variable differential transducer sensor means including a linear variable differential transducer coil assembly and a linear variable differential transducer core;
   (c) adjustable vertical mounting means for positioning said linear variable differential coil assembly at any vertical distance below the surface of said liquid product in said storage tank; and
   (d) connection means for rigidly connecting said float means to said linear variable differential transducer core, said core positioned below the surface of said liquid product and the combined center of gravity of said float, said connection means, and said core lying below the combined center of buoyancy of said float, said connection means, and said core, thereby permitting said core to move in relation to said coil assembly with changes in the height of said float means on the liquid product surface.

2. The device of claim 1, wherein said coil assembly is encapsulated in a liquid-tight container and said core moves through the center of said coil assembly but is immersed in said liquid product.

3. The device of claim 1, further comprising guide means attached to said sensor means, said guide means preventing large horizontal displacement of said float means and keeping said core in position in said sensor means.

4. The device of claim 1, further comprising means for commanding and collecting data from said sensor means.

5. The device of claim 1, wherein said float means are located in a protective tube, the size of said tube sufficiently greater than said float means that the effects of surface tension and friction do not prevent said float means from accurately tracking changes in the liquid product surface level.

6. The device of claim 1, wherein said float means and said sensor means are located in a protective tube, the size of said tube sufficiently greater than said float means that the effects of surface tension and friction do not prevent said float means from accurately tracking changes in the liquid product surface level.

7. The device of claim 1, further comprising means for preventing said float means from escaping from said sensor means when the liquid product surface level rises significantly.

* * * * *